United States Patent Office 2,967,177
Patented Jan. 3, 1961

2,967,177
PROCESS OF ANTIBIOTIC PURIFICATION

David A. Johnson and Glenn A. Hardcastle, Jr., Syracuse, N.Y., assignors, by mesne assignments, to Bristol-Myers Company, New York, N.Y., a corporation of Delaware No Drawing. Filed Mar. 31, 1958, Ser. No. 724,822

10 Claims. (Cl. 260—210)

This invention relates to a new and highly practical process for purifying the antibiotic kanamycin and, more particularly to the separation of kanamycin B from kanamycin A by preferential precipitation from aqueous solution at or below pH 7 of kanamycin B by an alkylaryl sulfonate followed, if desired, by separation of the precipitate and regeneration of kanamycin B therefrom or isolation of kanamycin A from the mother liquor.

Kanamycin is a stable, basic, water-soluble antibiotic first described by Umezawa et al. [see Umezawa et al., "Production and Isolation of a New Antibiotic, Kanamycin," The Journal of Antibiotics (Japan), Series A, X: 181–188, September 1957; Maeda et al. and Umezawa, "Studies on Kanamycin," The Journal of Antibiotics (Japan), Series A, X: 228–231, September 1957; Takeuchi et al. and Umezawa, "Biological Studies on Kanamycin," The Journal of Antibiotics (Japan), Series A, X: 107–114, May 1957; and Cron et al. and Hooper, J. Amer. Chem. Soc., 80, 752–753, February 5, 1958].

Kanamycin when produced by fermentation usually consists predominately of a single specific compound, designated kanamycin A but also contains a closely related substance designated kanamycin B. Each is a highly effective antibacterial agent but they do vary somewhat from one another in certain aspects of antibacterial activity and toxicity. It therefore became highly desirable to discover methods suitable for industrial use on a large scale for separating and purifying kanamycin A and kanamycin B in order to permit study and use of these two compounds, alone or in mixtures such as equal parts by weight, in various fields, including especially antibacterial therapy in man and animals. It is particularly difficult to prepare substantially pure kanamycin B because the usual acid addition salts of kanamycin B are more soluble than those of kanamycin A and thus crystallization and precipitation procedures serve only to decrease the kanamycin B content of the solid product and never give solid products containing a lower percentage of kanamycin A than that of the starting solution. For the same reason, it has not been possible to facilitate recovery from solutions of substantially pure kanamycin A by first removing substantially all the kanamycin B without excessive loss by co-precipitation of kanamycin A.

The above objectives have been achieved by the provision according to the present invention of, in the process of recovering a purified kanamycin from an aqueous solution containing both kanamycin A and kanamycin B, the step of adding to such a solution maintained below pH 8.1 an alkylarylsulfonate and, preferably, adding in an amount in the range of 0.5 to 4.5 g. per 1,000,000 mcg. kanamycin by plate bioassay and alkylarylsulfonate wherein the alkyl group contains at least nine carbon atoms.

In one embodiment there is provided by the present invention, in the process of recovering purified kanamycin B from an aqueous solution containing both kanamycin A and kanamycin B the steps of maintaining the pH of said solution below 7.1 while adding, in an amount in the range of 0.7 to 3.0 g. per 1,000,000 mcg. kanamycin by plate bioassay, an alkylarylsulfonate wherein the alkyl group contains at least nine carbon atoms and separating the kanamycin B-alkylarysulfonate thus formed and precipitated and then decomposing said kanamycin B-alkylarylsulfonate by metathetical reaction to regenerate purified kanamycin B.

In one particular and preferred embodiment there is provided by the present invention, in the process of recovering purified kanamycin B from an aqueous solution below pH 7.1 containing both kanamycin A and kanamycin B, the consecutive steps of adding an alkali metal salt of dodecylbenzenesulfonic acid in an amount in the range of 0.7 to 3.0 g. per 1,000,000 mcg. kanamycin by plate assay and separating the kanamycin B-dodecylbenzenesulfonate thus formed and precipitated and then decomposing said kanamycin B-dodecylbenzenesulfonate by metathetical reaction to regenerate purified kanamycin B.

Use is made in the present invention to selectively precipitate kanamycin B of anion-active surface agents of the class called alkylarylsulfonates. The preferred group is that wherein the alkyl group contains at least nine carbon atoms, e.g. sodium dodecylbenzene sulfonate, sodium decylbenzenesulfonate, sodium nonylbenzenesulfonate and alkali metal salts of alkylbenzenesulfonic acids and alkali metal salts of alkylnaphthalenesulfonic acids. Examples of such agents are described in U.S. Patent 2,340,654 and on pages 82–84 of Encyclopedia of Surface-Active Agents, 1952, Chemical Publishing Co. Inc., New York, N.Y. A preferred agent is sodium dodecylbenzenesulfonate (Ultrawet K). This agent reacts metathetically with a kanamycin salt, e.g. the sulfate, in aqueous solution to precipitate kanamycin dodecylbenzenesulfonate.

Use is made of 0.5 to 4.5 grams of the alkylarylsulfonate, and preferably 0.7 to 3.0 g. or about 1.5 g., per 1,000,000 mcg. of kanamycin in terms of plate activity. When separation of pure kanamycin B is desired, it is preferable to use minimum amounts of the alkylarylsulfonate despite loss thus incurred in order to minimize co-precipitation of kanamycin A.

The process is carried out by simply mixing aqueous solutions of the kanamycin salt and the alkali metal alkylarylsulfonate at or below pH 8.0, i.e. below pH 8.1, and preferably below pH 7.1 or at about pH 5–7.0 Such aqueous solutions may have been prepared from crude solids and may be potent fermentation broths but are preferably concentrated aqueous solutions obtained by adsorbing the kanamycin in a fermentation broth on an ion exchange resin and then eluting it therefrom. An equivalent process makes use of aqueous solutions of kanamycin as the free base and the alkylarylsulfonate in its acid form. Thus in the present invention the term an alkylarylsulfonate includes such a compound in its free acid form or as an alkali metal salt.

Purified kanamycin B is simply recovered from the precipitated salt of the present process as set forth in the examples below, e.g. by collecting it, dissolving it in methanol or acetone and adding a mineral acid such as sulfuric acid or an amine salt such as triethylamine sulfate to precipitate the kanamycin B as the sulfate.

Use of the process of the present invention is also an efficient way to remove nearly all the kanamycin B from aqueous solutions containing relatively small amounts of kanamycin B. The remaining mother liquor then contains substantially pure kanamycin A, which can easily be recovered as a pure product.

Further understanding of the invention may be obtained by reference to the following examples, which are illustrative only and are not the exclusive embodiment of the invention. We wish it to be understood that we do not desire to be limited to the exact details shown and described, for obvious modifications will occur to persons skilled in the art.

EXAMPLE 1

Kanamycin fermentation broth is adjusted to pH 10.5 by addition of sodium hydroxide and filtered using a filter aid (Dicalite). The filtrate is adjusted to pH 6.3–6.5 with 20% sulfuric acid and filtered again; alternatively whole broth is simply filtered once at pH 6.5 but this may result in a lower filtration yield.

The kanamycin in the filtrate is then adsorbed on and eluted from a cation exchange resin of the carboxylic acid type, e.g., a copolymer of methacrylic acid and divinyl benzene such as Amberlite IRC–50. Examples of such cation exchange resins are described in U.S. Patent 2,579,974. Thus, the kanamycin is adsorbed on IRC–50 ($Na^+$ form) resin and then eluted with 0.5 N sodium hydroxide or, preferably, adsorbed on IRC–50 ($NH_4^+$) resin and eluted with 1.0 N ammonium hydroxide.

The eluate, containing both kanamycin A and kanamycin B in the same proportion in which they occurred in the fermentation broth, is adjusted to pH 6–6.5 with 20% sulfuric acid and diluted to a concentration of 5,000 mcg./ml. by plate assay.

Sodium dodecylbenzenesulfonate (Ultrawet K; 7.0 g.) is then dissolved in 70 ml. water and added slowly with agitation to one liter of the neutralized eluate. Addition of a filter-aid (Dicalite) before addition of the Ultrawet K serves to avoid gumming on the tank walls in large scale runs. Larger amounts of Ultrawet K may be used to obtain higher recoveries of kanamycin B but the amount of kanamycin A in the product will then be increased.

Kanamycin B dodecylbenzenesulfonate precipitates and is collected by filtration along with the filter aid, washed with water and air-dried. The kanamycin B salt, but not the filter aid, is then dissolved by slurrying the cake in 100 ml. methanol for one hour, removing the filter-aid by filtration and washing the cake with 50 ml. methanol. To the clear filtrate containing the kanamycin B salt, dilute sulfuric acid is added until no more kanamycin B sulfate precipitates as can be determined by simple test on a filtered or centrifugal aliquot. The yield may be increased by addition of an equal volume of acetone. The purified kanamycin B sulfate is then collected by filtration and found to contain a much lower percentage of kanamycin A than was present in the original fermentation broth and resin column eluate.

This kanamycin B sulfate is converted to kanamycin B (free base) by dissolving it in water at 5000 mcg./ml. neutralizing to pH 6–6.5, filtering, adsorbing on IRC–50 ($NH_4^+$ form) resin, eluting with 1.0 N ammonium hydroxide, concentrating the eluate by distillation in vacuo to 300,000 mcg./ml., adding this concentrate to seven volumes methanol, removing the precipitate which is rich in kanamycin A by filtration, and adding the filtrate to five volumes of acetone to precipitate purified kanamycin B base.

EXAMPLE 2

A solution (1500 ml.) at pH 6 of kanamycin was obtained using two absorptions on IRC–50 resin in the sodium form followed by elution with sulfuric acid. To this solution there was added 45 g. sodium dodecylbenzenesulfonate (Ultrawet K) to precipitate kanamycin B dodecylbenzenesulfonate which was collected by filtration, washed with water and dissolved in methanol. The methanol solution was then acidified with sulfuric acid, leaving dodecylbenzenesulfonic acid in solution and precipitating more than 8.5 g. kanamycin B sulfate which was substantially free of kanamycin A as indicated by its bio-assay of 732 u./mgm. and its ultraviolet (furfural) assay of 45 u./mgm.

EXAMPLE 3

In another experiment 50 g. solid kanamycin (456 u./mgm. by bio-assay; 131 u./mgm. by ultraviolet furfural assay; ratio of 0.287 for the two assays) was dissolved at pH 6 in 2 l. water and 60 g. sodium dodecylbenzenesulfonate (Ultrawet) was added. The precipitate was collected, water-washed and dissolved in methanol and the methanol solution was acidified with sulfuric acid to precipitate purified kanamycin B sulfate. After repetition of this process, there was obtained 9.5 g. solid kanamycin B sulfate (630 u./mgm. by bio-assay; 51 u./mgm. by furfural ultraviolet assay; ratio=0.081).

EXAMPLE 4

Filtered kanamycin fermentation broth containing approximately equal amounts of kanamycin A and kanamycin B (see assay #1) at pH 6.5 and a volume of 7.5 l. was adsorbed on 300 ml. IRC–50 ($NH_4^+$ form) resin, washed with water and eluted with 1.5 l. 1 N ammonium hydroxide to give 1475 ml. rich eluate (see assay #2).

(a) A portion of this rich eluate (500 ml.) was concentrated by distillation in vacuo to a volume of 10 ml. and added to 100 ml. methanol, precipitating a small amount of kanamycin of substantially unchanged composition (see assay #3) which was collected by filtration. The filtrate was concentrated to a thick syrup and added to 100 ml. acetone to precipitate more kanamycin of unchanged composition (see assay #4).

(b) Another portion (950 ml.) of the rich eluate was adjusted to pH 6.0 by the addition of sulfuric acid. Ultrawet K (7.0 g.) in 70 ml. water was added slowly to the neutralized eluate to precipitate kanamycin B dodecylbenzenesulfonate which was collected by filtration after adding filter-aid (Dicalite). The cake was washed with water and extracted with 100 ml. methanol. After filtering and washing with methanol, sulfuric acid was added to the filtrate until no more kanamycin B sulfate precipitated. After addition of an equal volume of acetone to provide more complete precipitation, the kanamycin B sulfate was collected by filtration, washed with methanol and dried in vacuo at 50° C. (see assay #6).

The purification procedure was repeated by dissolving 1.5 g. of the kanamycin B acid sulfate produced above in 300 ml. water at pH 6.5, adding 2 g. Ultrawet K in 200

Assays

| Assay Number | Material | Volume or Weight | Plate Assay, mcg./ml. or mcg./mgm. | Turb. Assay, mcg./ml. or mcg./mgm. | Percentage by Bio-assay [1] | Percentage Kanamycin B by Paper Strip Chromatography |
|---|---|---|---|---|---|---|
| 1 | Filtered Broth | 7,500 ml | 730 | 1,400 | 47 | |
| 2 | Rich Eluate | 1,475 ml | 5,600 | 11,217 | 50 | 50 |
| 3 | (a) Methanol ppte | 0.70 g | 430 | 673 | 28 | 50 |
| 4 | (a) Acetone ppte | 2.58 g | 740 | 1,320 | 39 | 60 |
| 5 | (b) First Ultrawet K Mother Liquor | 1,330 ml | 2,200 | | | |
| 6 | (b) First Acid Sulfate | 1.60 g | 820 | 1,890 | 66 | 80 |
| 7 | (b) Second Ultrawet K Mother Liquor | 380 ml | 1,150 | 2,465 | 57 | |
| 8 | (b) Second Acid Sulfate | 0.70 g | 760 | 2,635 | 100 | 98–99 |

[1] Computed from ratio of turbidometric assay to plate assay.

ml., filtering, washing with water, extracting the cake with methanol, adding sulfuric acid to the methanol to complete precipitation of the kanamycin B sulfate and collecting the salt by filtration, washing it with methanol and drying it in a vacuum oven (see assay #8). There was thus produced kanamycin B sulfate substantially free of kanamycin A sulfate.

Starting materials

Method of obtaining the starting materials of the present invention, i.e. kanamycin, kanamycin salts, kanamycin solutions and kanamycin fermentation broths, are set forth in detail below.

Kanamycin is a new antibiotic which is effective in inhibiting the growth of Gram-positive, Gram-negative and acid fast bacteria such as *Mycobacterium tuberculosis*.

Kanamycin is prepared by cultivating a strain of *Streptomyces kanamyceticus* nov. spec. in an aqueous carbohydrate solution containing a nitrogenous nutrient under aerobic conditions until substantial antibacterial activity is imparted to said solution, whereafter the antibiotic is recovered and if necessary purified.

The micro-organism producing kanamycin was isolated from a sample of soils collected in Nagano Prefecture, Japan, and is a new species designated *Streptomyces kanamyceticus* of the genus Streptomyces. A culture has been deposited in the American Type Culture Collection, Washington, D.C. as A.T.C.C. 12853.

*Streptomyces kanamyceticus* has the following characteristics:

(1) Microscopic observation: Substrate mycelium is about 1μ in width and branched The aerial mycelium developed from submerged mycelium branches and bears the sporophorous at the end. Spirals and whorls are not usually observed.

(2) Glycerol-Czapek agar (27° C.): The growth is colorless at first, lemon yellow later. The reverse side is hay-colored. Aerial mycelium is white to yelow, occasionally with a greenish or faint pinkish tinge. A faint brown soluble pigment occasionally.

(3) Krainsky glucose asparagine agar (27° C.): Growth is colorless to yellow and the reverse side is white, faint pinkish white, yellow or hay-colored. Aerial mycelium is scant, usually developing from the center of the colony and is white, faint pinkish white, faint greenish yellow or yellow. No soluble pigment is usually found.

(4) Calcium malate agar (27° C.): Same as on Krainsky gucose asparaging agar, but growth is slighter. Sometimes there is no growth.

(5) Starch plate (27° C.): Almost same as Krainsky glucose asparagine agar, but growth is restricted and there is no aerial mycelium. Starch is hydrolyzed.

(6) Potato plug (27° C.): Growth is wrinkled, granular surface, faint yellowish brown to yellow. Aerial mycelium is none or scant and white. There is no soluble pigment. Plug beneath the growth is occasionally dark.

(7) Carrot plug (27° C.): Growth is usually scant. When grown it is almost the same as on potato plug.

(8) Peptone water with 0.2% sodium nitrate (27° C.): Surface ring growth is colorless to white yellow, and white growth at bottom. White aerial mycelium occasionally occurs. Nitrite is formed from nitrate. There is no soluble pigment.

(9) Peptone-meat extract agar (37° C.): Growth is wrinkled, white to yellow. There is no aerial mycelium or soluble pigment.

(10) Blood agar (37° C.): Growth is wrainkled, reddish brown with grayish tinge. There is no aerial mycelium or soluble pigment.

(11) Milk (37° C.): There is almost no change and growth is not usually observed at surface.

(12) Loeffler coagulated serum (37° C.): Growth is restricted, white to lemon yellow. There is no aerial mycelium or soluble pigment.

(13) Egg medium (37° C.): Growth is wrinkled. There is no aerial mycelium.

(14) Gelatin: Liquified; no soluble pigment.

(15) Utilization of carbon sources: The following carbon sources were utilized on Czapek salt basal medium: arabinose, dextrin, fructose, gelactose, glucose, glycerol, maltose, mannitol, mannose, raffinose, starch, sucrose, succinate. Carbon sources not utilized: Inositol, inulin, lactose, rhamnose, sorbose, xylose, acetate. Carbon sources utilized poorly: esculin, salicin, sorbitol, citrate.

(16) Production of the antibiotic, kanamycin.

The above characteristics are sufficient to distinguish the micro-organism from those hitherto described species of Streptomyces and to show that the strain K2-J belongs to a novel species. Variation or mutation of the above described organism is naturally expected since such is a common property of the organisms of Streptomyces.

The characteristics of this species may be summarized as follows: The growth of the colony is colorless to yellow with or without greenish or pinkish tinge. The reverse of the colony on synthetic agar is colorless, white, faint pinkish white, whitish yellow or hay-colored. The aerial mycelium is white to yellow and spirals and whorls are not formed. A faint brown soluble pigment is produced occasionally on a synthetic medium. Gelatin is liquified and starch is hydrolyzed.

*Streptomyces kanamyceticus* includes the typical strain No. K2-J described above and all natural and artificial variants or mutants thereof.

Production of kanamycin by fermentation

*Streptomyces kanamyceticus* (K2-J) was first cultured in shake flasks in the following media: (a) 0.75% meat extract, 0.75% peptone, 0.3% NaCl, with 1.0% of starch, dextrin, maltose, glucose, lactose, sucrose, or glycerol; (b) 2.0% soybean meal, 0.05% KCl, 0.05% $MgSO_4 \cdot 7H_2O$, 0.5% NaCl, 0.2% $NaNO_3$, with 1.0% of starch, dextrin, maltose, glucose, lactose, sucrose, or glycerol. The initial pH of all media was adjusted to 7.0. After 24-48 hours shaking in some cases the pH decreased to about 6.0-6.8, but from 72-120 hours the pH rose and became 7.5-8.6.

In the above medium (b) containing 2.0% starch, after 3 days of the shaking culture the pH rose to 8.2 and 250 mcg./ml. of kanamycin was produced. In the tank culture with the medium containing 2.0% starch, 0.5% glucose, 1.2% soybean meal, 0.05% KCl, 0.05% $MgSO_4$, 0.1% $K_2PO_4$, 0.3% NaCl, 0.3% peptone and 0.3% $CaCO_3$, the pH at the beginning was slightly lowered (6.6) and again increased and was 8.0 after 43 hours; 273 mcg./ml. of kanamycin was produced after 78 hours.

As the starting material for the production of kanamycin, fermentation broths as described above or crude products obtained by the treatment of the fermentation broths may be employed.

In general terms, kanamycin is preferably produced in media which contain organic nitrogen sources such as soybean meal, cotton seed meal, peanut meal, meat extract, peptone, corn steep liquor or yeast extract. The carbon sources which can be used include starch, dextrin, maltose, glucose, sucrose, lactose and glycerol. The combination of starch and soybean meal was found to be one of the best and is preferred; the addition of corn steep liquor, peptone, yeast extract, or nitrate to this combination promoted the production of kanamycin. The addition of magnesium sulphate, manganese chloride, or zinc sulphate was promotive; the maximum yield was obtained when the pH of the culture broth became weakly alkaline. The temperature of the cultivation may be varied in a wide range, 25°-35° C., within which the organism may grow, but the temperature of 27°-32° C. is preferable. Generally the cultivation is continued until a substantial quantity of kanamycin is accumulated in the medium. It requires in the deep aerated submerged culture, in general, two to seven days with maximum production usually occurring at from 3 to 5 days. The kanamycin is found in the liquid portion of the fermentation broth.

*Experimental methods*

Shake culture: 150 ml. of the medium was placed in a flask of 500 ml. volume and sterilized. It was inoculated with the mycelia and spores of the kanamycin-producing organism on the agar medium or with mycelium obtained from a 48-hour shake culture and then shake-cultured on the reciprocating shaking machine (120 strokes per minute and 8 cm. amplitude) at 27°–29° C.

Tank culture: A stainless steel fermenter of 400 l. volume was used. One hundred eighty liters or two hundred liters of the medium was placed therein and sterilized at 120° C. for 20 to 30 minutes. The aeration rate was 200 l. of air per minute and the r.p.m. of the stirrer was 200. Silicone, soybean oil or liquid paraffin was used as the antifoam.

*Extraction and purification of kanamycin*

In one method of recovering kanamycin from a fermentation broth, the broth is concentrated by vacuum evaporation or spray drying. The kanamycin can be extracted from the residue with water, methanol, ethanol or acetone; acidification with HCl improves the dissolving. The antibiotic can be adsorbed by activated carbon from neutral or alkaline aqueous solution and subsequently desorbed into dry or aqueous alcohol or aqueous acetone adjusted to pH 2.0 with hydrochloric acid. Kanamycin is also adsorbed at a pH about 6.0 to 9.0 by cation exchange resins preferably of the carboxylic acid type, such a copolymer of methacrylic acid and divinylbenzene. When adsorbed on a cation exchange resin the antibiotic can be eluted with aqueous hydrochloric acid, aqueous sulphuric acid, or aqueous organic solvents (for instance, 1 N HCl—10% aqueous acetone). Kanamycin can also be eluted by sodium hydroxide or ammonium hydroxide.

The eluate thus obtained can be concentrated by vacuum evaporation or by freeze-drying, and the kanamycin subsequently precipitated from the concentrated solution by adding a solvent in which kanamycin or its salt is substantially insoluble.

In still another method of purification one can use column chromatography with alumina or active carbon. For instance, an aqueous solution of kanamycin (pH 8.0) obtained by the repetition of the cation exchange resin process can be passed through a column containing active carbon and, after washing the column with distilled water, elution is made with 0.5 N $H_2SO_4$. The most active fraction of the eluate is added to methanol and crystalline kanamycin sulphate precipitated.

*Nature of kanamycin*

Kanamycin is obtained as its hydrochloride or sulphate and the free base of kanamycin is obtained from these salts, for instance, removing the sulfuric ion by baryta from kanamycin sulfate solution.

Kanamycin hydrochloride is freely soluble in water, methanol, slightly soluble in ethanol and insoluble in acetone, ethyl acetate, butyl acetate, benzene, ether or petroleum ether.

Kanamycin sulphate is soluble in water and insoluble in methanol, ethanol, acetone, ethyl acetate, and benzene.

The kanamycin base is soluble in water and substantially insoluble in n-butanol, ethyl acetate, butyl acetate, ether, chloroform and benzene.

Kanamycin when dissolved in pyridine and tested, gives positive ninhydrin reaction. Tollens, Sakaguchi and Fehling tests are negative. When the paper strip chromatography was carried out (with Toyo filter paper No. 50 and 0.2% p-toluenesulfonic acid butanol saturated with water) the $R_f$ value of kanamycin was 0.21–0.26.

Kanamycin exhibits optical activity. When a 1.0% aqueous solution of purified kanamycin hydrochloride was tested, $[\alpha]_D^{17}$ was $+103°$, and when a 1.0% aqueous solution of kanamycin free base was tested, $[\alpha]_D^{17}$ was $+112°$, and when a 1.0% aqueous solution of crystalline kanamycin sulphate was tested $[\alpha]_D^{23}$ was $+121°$.

Kanamycin base exhibits no absorption of ultraviolet light from 220 m$\mu$ to 400 m$\mu$.

*Activity of kanamycin*

Kanamycin, when tested by the agar dilution method, showed the following antibacterial spectrum:

| Micro-Organism | Minimum Concentration for Complete Inhibition in mcg./ml. |
|---|---|
| S. lutea PCI-1001 | 1.8 |
| M. pyogenes var. aureus 209–P | 2.2 |
| M. pyogenes var. aureus Terajima | 0.4 |
| Micrococcus flavus | 9.0 |
| B. subtilis PCI-219 | 4.5 |
| B. subtilis NRRL-558 | 4.5 |
| B. subtilis Tracy | 9.0 |
| E. coli | 2.2 |
| S. paratyphi A | 3.1 |
| S. dysenteriae | 1.6 |
| Proteus vulgaris | 6.2 |
| Mycobacterium 607 | 3.1 |
| Mycobacterium phlei | 2.2 |
| Sacc'..aromyces sake | >300 |
| Saccharomyces | >300 |
| Candida albicans | >300 |
| Aspergillus niger | >300 |

In Kirchners medium it inhibited Mycobacterium tuberculosis $H_2$ strain at 2 mcg./ml. The streptomycin resistant *E. coli* and streptomycin-fast *Mycobacterium tuberculosis hominis* was sensitive to kanamycin.

*Preparation of kanamycin*

PROCEDURE 1

The medium (180 l.) containing 2.0% starch, 1.0% glucose, 1.2% soybean meal, 0.3% NaCl, 0.05% KCl, 0.05% $MgSO_4·7H_2O$, 0.1% $K_2HPO_4$, 0.2% $CaCO_3$, 0.3% $NaNO_3$, 0.002% $MnSO_4·7H_2O$ and 0.002% $ZnSO_4·7H_2O$ was placed in a fermenter of 400 l. volume, adjusted to pH 7.4, sterilized for 30 minutes at 120° C., inoculated with 1000 ml. of 40 hour shake-cultured broth of *S. kanamyceticus* (a selected subculture of K2–J strain) and tank-cultured at 27°–29° C. As antifoam, soybean oil (0.04%) and silicone (0.04%) were added. The results were as follows:

| Hrs. | pH | Kanamycin, mcg./ml. | Reducing sugar percent in liquid | $NH_3$—N mg. percent in liquid |
|---|---|---|---|---|
| 0 | 6.6 | | 2.20 | 2.5 |
| 24 | 6.9 | | 1.50 | 10.7 |
| 36 | 7.6 | 150 | 0.4 | 1.2 |
| 48 | 7.6 | 200 | 0.3 | 1.2 |
| 60 | 8.0 | 220 | 0.3 | 6.0 |
| 72 | 8.2 | 210 | 0.25 | 12.0 |

PROCEDURE 2

The medium (200 l.) containing 2.0% starch, 1.0% soybean meal, 0.05% KCl, 0.05% $MgSo_4·7H_2O$, 0.3% NaCl, 0.2% $NaNO_3$ was placed in the 400 liter fermenter, the pH was adjusted to 7.5, and the medium was then sterilized (pH after the sterilization was 7.0), and further handled as in case of the Procedure 1. The broth after 48 hours was found to contain 250 mcg./ml. of kanamycin. Thereafter, the concentration of kanamycin in the broth was not markedly changed. After 65 hours of fermentation, the broth was filtered. Thus 160 l. of filtered broth was obtained. The filtered broth contained 150 mcg./ml. of kanamycin and the pH was 8.2. The filtrate was passed through a cation exchange resin column. The column was 15 cm. in diameter and contained 6 l. of IRC–50 in the sodium form (i.e. regenerated with sodium hydroxide) at pH 8.0. Amberlite IRC–50 is a commercially available cation exchange resin of the carboxylic type; it is a copolymer of methacrylic acid and divinyl benzene. The filtrate was passed through the column at the rate of 16 l./hour. In the effluent no antibacterial activity against Mycobacterium 607 was detected by the cylinder plate method. The column was then washed with about 10 l. of distilled water which was passed through the column at the same speed as the broth filtrate. Thereafter, 1 N HCl was passed through the column at the rate of 0.8 l./hour. The eluate was collected in 2 l. portions (cuts). After the 7th cut the eluates became acidic and the kanamycin was found in the 7th–10th cuts inclusively. The cuts containing kanamycin were combined and the combined solution (8 l. in volume) was adjusted to pH 6.0 with 10% NaOH, and concentrated (by distillation under vacuum at about 50° C.) to 3000 ml. The concentrated solution was freeze-dried. The brownish white powder of 500 g. thus obtained contained 8 g. of kanamycin. It was dissolved in 2 l. of methanol, and, after the insoluble part was removed, acetone (20 l.) was added and 80 g. of the brownish white powder was obtained. This powder contained 8 g. of kanamycin. Twenty grams of this powder were dissolved in 40 ml. of distilled water and saturated aqueous ammonium reineckate solution was added. The light pinkish precipitate which first appeared and which weighed 50 mg. was removed, and more ammonium reineckate solution was added until no more precipitate formed. This pinkish precipitate was collected and recrystallized from distilled water, and crystilline pink kanamycin reineckate (300 mg.) was obtained. It darkened at 191°–193° C. and decomposed at 211°–213° C. The light pinkish precipitate which first appeared also contained kanamycin.

PROCEDURE 3

A. kanamyceticus (a selected subculture of K2–J strain) was inoculated to 200 l. medium placed in a 400 l. stainless steel fermenter and fermented. The medium contained starch 2.0%, glucose 1.0%, soybean meal 1.2%, NaCl 0.3%, KCl 0.05%, $MgSO_4 \cdot 7H_2O$ 0.05%, $K_2HPO_4$ 0.1%, $CaCO_3$ 0.2% and peptone 0.3%. The pH of the medium after sterilization was 7.0. Soybean oil was added to the medium at 0.1% as an antifoam. After sixty-five hours of aerated deep culture, the broth contained 220 mcg./ml. of kanamycin. The pH was 8.0. It was filtered and 170 l. of the filtrate was obtained (210 mcg./ml.). It was passed through the cation exchange resin tower. The resin tower contained 6 l. of IRC–50 resin in the sodium cycle at pH 8.0 and was 15 cm. in diameter. The rate of flow was 30 l./hour, that is, ½ liter of resin volume per minute. Thereafter, 30 l. water was passed through the resin tower at the rate of 30 l./hour. Kanamycin adsorbed by the resin was then eluated with 1 N HCl, the flow rate being 3.0 l./hour. The first eluate (6.5 l.) contained no activity; the following eluate contained kanamycin. Ninety percent of the adsorbed kanamycin appear in the eluate, the pH of which was higher than 2.0. The active eluate (16 l.) was adjusted to pH 7.5 with 10% NaOH. It was then diluted to 80 l. The yield here from the broth filtrate was 83%. The diluted solution was passed again through a resin column. The column contained 2 l. of IRC–50 resin in the sodium cycle at pH 7.5. The diameter of the column was 5 cm. The rate of the flow was 10 l./hour. The column was washed with 20 l. of water at a rate of flow of 10 l./hour. The adsorbed kanamycin was then eluted with 1 N HCl. The rate of flow was 3.0 l./hour. As in the previous elution kanamycin appeared in the eluate, the pH of which was higher than 2.0. The active eluate (4.5 l.) was adjusted to pH 6.0 by the addition of the anion exchange resin, IR–4B, in the hydroxyl form. Amberlite IR–4B is a commercially available weakly basic anionic exchange resin of the type described in U.S. Patent 2,591,573. It was evaporated under vacuum at about 40° C. to 500 ml. To this concentrated solution 5 liters of methanol was added and the insoluble part was removed. The filtrate was evaporated under vacuum at about 40° C. to 250 ml. and to the concentrated solution 2.5 liters of acetone was added and 65 g. kanamycin was obtained as a light brownish powder. The potency of this powder was 350 mcg./mg.

PROCEDURE 4

The brownish white kanamycin (5 g.) obtained in Procedure 3 was dissolved in 50 ml. of 60% aqueous methanol, insoluble material was removed and to the filtrate 40 ml. of 60% aqueous methanol containing 2000 mg. of ammonium sulfate was added, and the precipitated kanamycin sulfate was collected, washed with 50 ml. of 80% aqueous methanol, and dried. Thus 4.5 g. of kanamycin sulfate was obtained as a light brownish powder. The potency was 370 mcg./mg.

PROCEDURE 5

Kanamycin hydrochloride (10 g.; 450 mcg./mg.) obtained by a process similar to that shown in Procedure 3 was dissolved in one liter of distilled water and the pH was adjusted to 6.4. It was added to a column of 75 ml. of IRC–50 resin in the sodium form at pH 6.4 at a flow rate of 10 ml./minute. After the column was washed with 50 ml. water, the adsorbed kanamycin was eluted by 5% $NH_4OH$. The first eluate (80 ml.) had no activity and the further eluate (130 ml.) contained kanamycin. The pH of this eluate was higher than 10.0. It was evaporated under vacuum at about 40° C. to 22 ml. The yield in this concentrated solution was 97.8%. This concentrated solution was passed through a carbon column containing 20 g. of active carbon of 100–250 mesh. The diameter of the column was 2 cm. Thereafter the column was washed with 160 ml. of distilled water and chromatographically developed with 0.5 N $H_2SO_4$. The effluent was cut in about 20 ml. portions. The kanamycin sulphate appeared from the 5th cut. The 1st–4th cuts were pH 6.2–6.4 and did not contain kanamycin. Almost all of the kanamycin was found in the 5th–8th cuts as follows: 5th cut, pH 8.2, 22.0 ml., 16.9 mg./ml.; 6th cut, pH 8.6, 23.0 ml., 65.3 mg./ml.; 7th cut 8.6, 20.0 ml., 55.0 mg./ml.; 8th cut pH 4.6, 22.0 ml., 47.5 mg./ml.; 9th cut, pH, 1.0, 22.0 ml., 4.2 mg./ml. To the 6th cut 23.0 ml. of methanol was added and crystalline kanamycin sulphate was precipitated, collected and dried. Thus 1.39 g. of crystalline kanamycin sulphate was obtained. 1.2 g. of this crystalline sulphate was dissolved in 8 ml. of water and warmed to 45° C. and 6.5 ml. of methanol was added with stirring and cooled. Then, kanamycin sulphate (1.07 g.) was precipitated and was obtained in crystalline form. Microscopically it was colorless plate crystals. It did not melt below 250° C.; $[\alpha]_D^{23} = +121°$ C.

PROCEDURE 6

A very useful process for isolating pure crystalline kanamycin from fermentation broths on a large scale begins with removal of mycelium by filtration of broth which has been acidified to pH 4.5–5 with sulfuric acid. If desired this filtration is facilitated by holding the broth 12 hours at room temperature or 30 minutes at 50° C.; the thinning or increase in fluidity thus produced is attributed to the action of the enzymes present. The acid-filtered broth is then neutralized to about pH 6–7 with sodium hydroxide and absorbed on an IRC–50 resin column in the sodium form. Alternatively, the filtration is omitted and the thinned broth is diluted with an equal volume of water, put through a separator to remove particles larger than 20 mesh, neutralized and absorbed on the column.

After washing the column with water, the kanamycin is eluated with 1 N or 5% $H_2SO_4$ to provide about a tenfold volume reduction.

Then the eluate is diluted three-fold, neutralized with ammonium hydroxide and absorbed on IRC–50 resin in the ammonium form. The kanamycin is then eluted with 0.5 N NH₄OH and the eluate is concentrated to about one-sixth volume by distillation in vacuo; addition to the concentrate of one to four volumes methanol followed by pH adjustment to 8.2–8.4 by addition of sulfuric acid precipitates solid kanamycin sulphate.

Kanamycin as produced by the specific procedures defined above usually consists predominately of a single specific compound, designated Kanamycin A but more usually referred to simply as kanamycin. Kanamycin also contains a closely related substance which has been designated kanamycin B. Each of these forms of kanamycin is understood to have all of the biological properties and most of the chemical and physical properties described above.

Pure kanamycin A is prepared by repeated recrystallization of the sulphate from methanol-water at pH 7.8–8.2. Mixtures of kanamycin A and B are separated by paper-strip chromatography in Peterson's n-butanol-water-2% p-toluenesulfonic acid system on Schleicher and Schuell 589 Blue Ribbon or Whatman No. 1 papers. In this system with S & S 589 Blue Paper, kanamycin A has an $R_f$ of about 0.35 and kanamycin B has an $R_f$ of about 0.6. The presence of impurities or contaiminating salts interferes markedly with the paper chromatography of the kanamycins in this system. Kanamcyin A, but not kanamycin B, on treatment with 40% sulfuric acid for 100 minutes at 100° C. yields a product with an ultraviolet spectrum identical to that of furfural.

Isolation and purification of kanamycin A

Kanamycin A Sulphate: Kanamycin A was isolated from fermentation broths by adsorption on IRC–50 resin in the sodium cycle and elution with aqueous hydrochloric acid. The eluate was neutralized, diluted and readsorbed on IRC–50 which has been regenerated with ammonium hydroxide. The column was eluted with 0.2 N NH₄OH, the eluate concentrated in vacuo to approximately 50–100 mg./ml. of kanamycin activity, diluted with 0.8–1 volume of methanol and adjusted with H₂SO₄ to pH 8.0–8.2. Kanamycin A sulphate crystallized slowly in small irregular pale yellow prismatic crystals.

The crystalline kanamycin A sulphate was purified by repeated recrystallization from methanol-water at pH 7.8–8.2 to give white irregular prismatic crystals. This preparation contains adsorbed moisture which is removed with difficulty. Samples for analytical determinations were dried to constant weight at 170° C. in vacuo.

*Analysis.*—Calcd. for $C_{18}H_{34}N_4O_{11} \cdot H_2SO_4$: C, 37.25; H, 6.25; N, 9.65; S, 5.52; SO₄, 16.6; neutral eq., 145.1.

Calcd. for $C_{18}H_{36}N_4O_{11} \cdot H_2SO_4$: C, 37.13; H, 6.58; N, 9.62; S, 5.50; SO₄, 16.6; neutral eq., 145.6.

Found: C, 37.3, 37.4, 37.3; H, 6.8, 6.6, 6.3; N, 9.3, 9.6; S, 5.5; SO₄, 16.8; neutral eq., 146.6.

The sulphate is soluble in water, insoluble in the common alcohols and nonpolar solvents. It shows no melting point, decomposing over a wide range above 250° C. It gave $[\alpha]_D^{24}$ 125° (c.=1, N/10 H₂SO₄) on an anhydrous basis.

Kanamycin A Base: A 100 g. portion of kanamycin A sulfate in 2.1 of water was treated with IR410 (OH) resin in portions until the pH rose to 10.2. After removing the resin by filtering, the filtrate was concentrated to a volume of 300 ml. After diluting with an equal volume of methanol, stirring for 10 minutes with 10 g. of carbon (Darco G60), and filtering to remove the carbon, 600 ml. of warm ethanol was added with stirring. The slight amorphous precipitate which formed was removed by filtering. On further heating of the clear solution, crystallization began. After standing overnight, the product, kanamycin A base, was removed by filtering, washed with methanolethanol, ether and then air-dried. A yield of 71.6 g. was obtained; $[\alpha]_D^{24} + 146°$ (c.=1, N/10 H₂SO₄).

*Analysis.*—Calcd. for $C_{18}H_{34}N_4O_{11}$: C, 44.8; H, 7.1; N, 11.6; neut. eq. 120.6; molec. wt. 482.5. Calcd. for $C_{18}H_{36}N_4O_{11}$: C, 44.6; H, 7.5; N, 11.6; neut. eq. 121.1; molec. wt. 484.5.

Found: C, 44.7, 45.0; H, 7.40, 7.6; N, 11.0, 11.5 (Dumas); 11.8, 11.8 (Van Slyke); neut. eq., 121.5; molec. wt., 468, 444 (Rast); 427, 490 (Signer).

Tetra-N-acetyl kanamycin A: A solution of 40 g. kanamycin A base in 360 ml. methanol and 68 ml. acetic anhydride was allowed to stand overnight. The waxy precipitate which formed was recovered by filtering and washed with a 200 ml. portion of methanol. The product was then dissolved in 200 ml. H₂O, stirred for ½ hour with 4 g. carbon (Darco G60) filtered and the solution concentrated to dryness in vacuo. Addition of 500 ml. methanol to this residue and slight warming converted it to a crystalline product, yield 33.8 g. The material was recrystallized by dissolving in water, concentrating to a syrup in vacuo and adding excess methanol.

*Analysis.*—Calcd. for $C_{26}H_{44}N_4O_{15}$: C, 47.9; H, 6.8; N, 8.4. Found: C, 48.5; H, 6.90; N, 8.5.

Tetra-N-acetyl-kanamycin A melted at 250°–255° C. (dec.).

Kanamycin A picrate: A hot solution of 5 grams of kanamycin A in 50 ml. of water was added to a boiling solution of 8 grams of picric acid in 350 ml. of water. The resulting clear solution was allowed to cool slowly to room temperature while the crystalline picrate separated out slowly from the solution. Filtering and drying afforded 11.2 grams of crude yellow crystals. This material was recrystallized by dissolving in boiling water and allowing to cool slowly to room temperature. The yellow crystals were filtered off and dried and melted with decomposition at 225°–230° C.

*Analysis.*—The analytical sample was dried at 110° C. in vacuo. Calcd. for $C_{42}H_{48}N_{16}O_{39}$: C, 36.0; H, 3.46. Found: C, 36.2, 36.2; H, 3.62, 3.60.

Kanamycin A has an empirical formula of $$C_{18}H_{34-36}N_4O_{11}$$

Treatment of kanamycin A with methanolic HCl under conditions which hydrolyze neomycin B and C to neomycin A (neamine) resulted in recovery of unchanged starting material.

Hydrolysis of kanamycin A in aqueous 6 N HCl (20 g./100 ml.) for 45 minutes at 100° C. yielded the crystalline hydrochloride of an optically inactive base which was identical with 1, 3-diamino-4, 5, 6-trihydroxycyclohexane (desoxystreptamine) isolated from the vigorous hydrolysis of neomycin.

The wave lengths in microns of characteristic infra-red absorption maxima for kanamycin A base and sulfate when pelleted in potassium bromide after drying at 176° C. are as follows:

Kanamycin A

| Base | | Sulfate | |
|---|---|---|---|
| 2.86 shoulder | 8.08 w | 2.88 vs | 8.13 shoulder |
| 2.93 vs | 8.19 m | 2.93 vs | 8.23 m |
| 2.97 vs | 8.43 m | 3.03 vs | 8.30 m |
| 3.01 vs | 8.55 s | 3.15 vs | 8.50 shoulder |
| 3.03 vs | 8.68 s | 3.20 shoulder | 8.62 shoulder |
| 3.15 s | 8.79 vs | 3.25 shoulder | 8.77 vs |
| 3.22 s | 8.90 s | 3.41 vs | 8.85 shoulder |
| 3.67 s | 9.00 vs | 3.47 vs | 8.95 shoulder |
| 6.23 s | 9.20 vs | 3.60 shoulder | 9.18 shoulder |
| 6.35 s | 9.47 shoulder | 3.65 shoulder | 9.23 shoulder |
| 6.42 shoulder | 9.63 vs | 3.78 shoulder | 9.38 vs |
| 6.75 shoulder | 9.85 vs | 3.90 shoulder | 9.57–9.82 vs |
| 6.85 m | 10.08 vs | 4.77 m | 9.95 shoulder |
| 6.93 m | 10.36 shoulder | 6.03 m | 10.15 vs |
| 7.10 s | 10.63 m | 6.25 s | 10.35 s |
| 7.23 s | 10.95 m | 6.58 s | 10.50 shoulder |
| 7.33 s | 11.25 m | 6.85 m | 10.74 s |
| 7.4E s | 11.35 shoulder | 7.03 shoulder | 10.88 shoulder |
| 7.57 shoulder | 11.50 shoulder | 7.15 m | 11.13 w |
| 7.63 w | 11.73 w | 7.33 m | 11.48 m |
| 7.75 shoulder | 11.95 m | 7.45 shoulder | 11.55 shoulder |
| 7.82 m | 12.28 m | 7.53 shoulder | 11.93 m |
| 7.85 shoulder | 12.48 w | 7.58 m | 12.43 m |
| 7.90 shoulder | 12.77 s | 7.73 w | 12.78 m |
| 7.95 shoulder | 13.05 s | 8.00 m | 13.15 m |

In the table, (vs) means very strong, (s) is for strong, (m) is for medium and (w) is for weak.

(A) IN VITRO SPECTRUM BY THE AGAR DILUTION METHOD—Continued

| Organism | Minimum Inhibitory Kanamycin A | Concentration in mcg./ml., Kanamycin B |
|---|---|---|
| Neisseria sp. | 2.5 | 1.25 |
| Salmonella enteritidis ATCC #4432 | 1.6 | 0.8 |
| Salmonella gallinarum | 1.6 | 1.6 |
| Salmonella paratyphi A | 1.6 | 1.6 |
| Salmonella paratyphi B | 6.25 | 3.1 |
| Salmonella pullorum | 0.8 | 0.4 |
| Salmonella schottmuelleri | 12.5 | 6.25 |
| Serratia marcencens (Wisconsin) | 3.1 | 3.1 |
| Serratia marcencens (Yale) | 6.25 | 3.1 |
| Shigella dysenteriae | 1.6 | 0.8 |
| Shigella paradysenteriae | 1.6 | 1.6 |
| Shigella sonnei | 3.1 | 6.25 |
| Streptococcus agalactiae ATCC #7077 | 25.0 | 25.0 |
| Streptococcus dysgalactiae ATCC #9926 | 3.1 | 12.5 |
| Streptococcus mitis ATCC #9811 | 100 | 50.0 |
| Streptococcus pyogenes C203 | 50 | 50 |
| Streptococcus sanguis ATCC #10556 | 50.0 | 50.0 |
| Vibrio comma | 0.8 | 0.8 |

(B) ACTIVITY VERSUS *Mycobacterium tuberculosis*

| Organism | Minimum Inhibitory Concentration, mcg./ml. | | |
|---|---|---|---|
| | Kanamycin A | Kanamycin B | Streptomycin |
| M. tuberculosis (H37Rv) | 0.4-0.8 | 2.0-6.0 | 0.2-0.6 |
| M. tuberculosis (H37Rv$_r$) | 0.2-0.8 | 1.4-6.0 | >2000 |

(C) TURBIDOMETRIC ASSAY

The turbidometric assay of crystalline kanamycin B gave assay values of 3880 and 4000 mcg./mg. based on kanamycin A free base. *Micrococcus pyogenes* va. *aureus* was used as the assay organism.

(D) PLATE DIFFUSION ASSAY

Kanamycin B assayed against *Bacillus subtilis* by agar diffusion techniques using kanamycin A as a standard gave the following values:

| Sample of Kanamycin B | Potency (mcg./mgm.) | Furfural Assay (mcg./mgm.) |
|---|---|---|
| B-64 | 1,000 | 0 |
| B-57 | 1,040 | 15 |
| B-65 | 1,300 | 30 |

Kanamycin is effective in inhibiting the growth of Gram-positive, Gram-negative and acid-fast bacteria. Kanamycin is nontoxic and exhibits a therapeutic effect on mice infected with Gram-positive and Gram-negative bacteria. Kanamycin also exhibits a therapeutic effect on infections of virulent tubercular bacilli in mice and guinea pigs. Kanamycin is useful in cure of bacterial infections in humans, e.g. pneumonia, tuberculosis.

By virtue of its broad spectrum of antibacterial activity, kanamycin and its salts are useful as general disinfectants, as for glassware; use is thus made of a five percent aqueous solution of kanamycin base or sulfate.

Kanamycin is a useful agent for the treatment of mastitis in cattle or calf scours; for this purpose use is made, for example, of suspensions of vegetable oil for instillation in the teats to treat mastitis, containing 1 to 1000 mgm./ml., and preferably about 50 mgm., of the antibiotic, or enough capsules to provide a total dosage of 0.25 to 2.0 grams by oral administration as for calf scours.

The antibiotic of the present invention is a useful agent for the preservation of fresh-water and salt-water fish. Thus when dusted over the exposed surfaces of the fish, after cleaning, at the rate of 0.1 to 1000 mgm./kg. of weight of fish, the spoilage and development of odor and rancid taste in the absence of refrigeration is suppressed for many days. This is of particular importance to hunters and fishermen during warm weather. The antibiotic is applied as a solution or suspension in a liquid, e.g. water, or as a powder which may contain inert diluents such as talc and is applied by spraying, dipping or simple dusting.

We claim:
1. In the process of recovering a purified kanamycin from an aqueous solution containing both kanamycin A and kanamycin B, the step of adding to such a solution maintained below pH 8.1 an alkylarylsulfonate wherein the alkyl group contains at least nine carbon atoms whereby kanamycin B-alkylarylsulfonate is formed and precipitated and then separating the precipitated kanamycin B-alkylarylsulfonate from the aqueous solution containing substantially pure kanamycin A.

2. A process as claimed in claim 1 wherein the precipitated kanamycin alkylarylsulfonate is collected and then decomposed by metathetical reaction to regenerate purified kanamycin B.

3. In the process of recovering purified kanamycin B from an aqueous solution containing both kanamycin A and kanamycin B, the steps of maintaining the pH of said solution below 7.1 while adding an alkylarylsulfonate wherein the alkyl group contains at least nine carbon atoms and separating the kanamycin B-alkylarylsulfonate thus formed and precipitated.

4. In the process of recovering purified kanamycin B from an aqueous solution containing both kanamycin A and kanamycin B, the steps of maintaining the pH of said solution below 7.1 while adding an alkylarylsulfonate wherein the alkyl group contains at least nine carbon atoms and separating the kanamycin B-alkylarylsulfonate thus formed and precipitated and then decomposing said kanamycin B-alkylarylsulfonate by metathetical reaction to regenerate purified kanamycin B.

5. In the process of recovering a purified kanamycin from an aqueous solution containing both kanamycin A and kanamycin B, the step of adding to such a solution maintained below pH 7.1 an alkylarylsulfonate wherein the alkyl group contains at least nine carbon atoms in an amount in the range of 0.5 to 4.0 g. per 1,000,000 mcg. kanamycin by plate bioassay.

6. In the process of recovering a purified kanamycin from an aqueous solution containing both kanamycin A and kanamycin B, the step of adding to such a solution maintained below 7.1 an alkylarylsulfonate wherein the alkyl group contains at least nine carbon atoms in an amount in the range of 0.7 to 3.0 g. per 1,000,000 mcg. kanamycin by plate bioassay.

7. In the process of recovering purified kanamycin B from an aqueous solution containing both kanamycin A and kanamycin B, the steps of maintaining the pH of said solution below 7.1 while adding, in an amount in the range of 0.5 to 4.5 g. per 1,000,000 mcg. kanamycin by plate bioassay, an alkylarylsulfonate wherein the alkyl group contains at least nine carbon atoms and separating the kanamycin B-alkylarylsulfonate thus formed and precipitated and then decomposing said kanamycin B-alkylarylsulfonate by metathetical reaction to regenerate purified kanamycin B.

8. In the process of recovering purified kanamycin B from an aqueous solution containing both kanamycin A and kanamycin B, the steps of maintaining the pH of said solution below 7.1 while adding, in an amount in the range of 0.7 to 3.0 g. per 1,000,000 mcg. kanamycin by plate bioassay, an alkylarylsulfonate wherein the alkyl group contains at least nine carbon atoms and separating the kanamycin B-alkylarylsulfonate thus formed and precipitated and then decomposing said kanamycin B-alkylarylsulfonate by metathetical reaction to regenerate purified kanamycin B.

9. In the process of recovering purified kanamycin B from an aqueous solution below pH 7.1 containing both kanamycin A and kanamycin B, the consecutive steps of Both kanamycin A and kanamycin B were obtained in pure form by way of counter-current distribution of the salicylidene derivatives in the system methanol-water-chloroform-benzene in the ratio by volume of 5:4:2:1. Thus, kanamycin sulphate (10 g.) was dissolved in water and treated with a solution of barium hydroxide to convert it to the base by precipitating barium sulphate. The filtrate was then shaken with a solution of 8 g. salicylaldehyde in butanol and the precipitation of the Schiff's base (tetra-salicylidene derivative of kanamycin) was completed by the addition of 2 N sodium hydroxide. The butanol phase was separated, combined with additional butanol used to extract the aqueous phase, washed with aqueous sodium bicarbonate and distilled in vacuo to leave the Schiff's base as residue.

In one case, distribution using 200 transfers gave peak concentrations of the tetra-salicylidene kanamycin A at about tube 65 and the tetra-salicylidene kanamycin B at about tube 40. The contents of the tubes near these peaks were combined and the derivative therein was converted to sulphate by dissolving it in acetone and adding dilute aqueous sulfuric acid to decompose the Schiff's base and precipitate kanamycin sulphate which was then redissolved in water and precipitated by the addition of methanol-acetone (1:1) to give kanamycin A sulphate (423 u./mgm. by bio-assay; 470 u./mgm. by furfural ultraviolet assay) and kanamycin B sulphate (936 u./mgm. by bio-assay; 25 u./mgm. by furfural ultra-violet assay). These sulphates were converted to the respective free bases by dissolving them in water, raising the pH of 3-4 to 10-10.5 with a basic anionic exchange resin, e.g. IR-410, filtering off the resin and then lyophilizing the filtrate. These kanamycin A and B bases were demonstrated by paper strip chromatography to be free of kanamycin B and A, respectively.

In another case, 10 g. kanamycin (700 u./mgm. by bio-assay; 110 u./mgm. by furfural ultraviolet assay) was converted to the salicylidene derivative and put through 300 transfers. The peak concentration of the tetra-salicylidene-kanamycin B was found in tube 63; found by analysis after drying at 110° C.: C, 61.95; 62.12; H, 6.02, 5.87. The tetra-salicylidene-kanamycin B, which decomposed at 255—265° C., was converted to kanamycin B sulphate and then to kanamycin B base according to the previous procedure. The base was then recrystallized from 95% ethanol (1000 mcg./mgm. by bio-assay; 0 mcg./mgm. by furfural ultraviolet assay).

Kanamycin B base decomposes at a considerably lower temperature than kanamycin A base; thus, kanamycin B base darkens at 170° C. (corr.) and forms a dark gum on drying in vacuo at the boiling point of cymene (176° C.). Kanamycin B base exhibits $[\alpha]_D = +135°$ (c.=0.63 in water) and contained by analysis 44.69% carbon and 7.48% hydrogen and 12.65, 13.62% nitrogen after correction for the 10.3% loss in weight found on drying a sample at 110° C.

The wave lengths in microns of characteristic infra-red absorption maxima for kanamycin B base when pelleted in potassium bromide after drying at 137° C. for 15 hours in vacuo are as follows: 2.96, 3.44, 6.35, 6.48 (shoulder), 6.74, 6.85 (shoulder), 7.25, 7.45, 7.86, 8.08, 8.28, 8.76, 9.55, 9.65, 10.4 and 11.15.

About 2 g. of kanamycin B base was treated with 4 ml. acetic anhydride in 20 ml. methanol. After standing overnight, crystals of products separated. Precipitation was completed by the addition of ether and the product, tetra-N-acetyl-kanamycin B was washed with more ether, recrystallized from aqueous ethanol and found to darken at 180° C. but not to melt below 280° C. Found by analysis: C, 48.64, 48.66; H, 6.64, 6.73; N, 9.82, 9.79.

Kanamycin A and kanamycin B were also separated and prepared in pure form by ion exchange resin column chromatography. A column 35 mm. in diameter and 870 mm. high was filled with 800 ml. of Amberlite IRC 50 (200 mesh) in the ammonium form and brought to equilibrium with 0.075 N $NH_4OH$. A solution of 6 g. kanamycin base (bio-assaying 580 mcg./mgm.) in 120 ml. water was passed slowly through the column followed by 0.075 N $NH_4OH$ as the eluting agent. The eluate was collected at the rate of about 250-300 ml. per 24 hours in test tubes holding about 17-18 ml. The contents of each test tube were bio-assayed on pH 8 trays. Consecutive tubes having comparable activity were combined into "fractions," concentrated by distillation in vacuo and lyophilized to give solid kanamycin base which was weighed and assayed. The results may be summarized as follows:

| Fraction Number | Tube Numbers | Weight in mgms. | Potency in mcg./mgm. | |
|---|---|---|---|---|
| | | | By Bio-assay | By furfural Ultra-violet assay |
| I | 29-44 | 19 | 30 | 184 |
| II | 971-1070 | 13 | 140 | 274 |
| III | 1071-1200 | 22 | 180 | 368 |
| IV | 1201-1500 | 39 | 350 | 512 |
| V | 1501-1700 | 43 | 450 | 654 |
| VI | 1701-2000 | 531 | 660 | 734 |
| VII | 2001-2300 | 16 | 370 | 594 |
| VIII | 2301-2600 | 36 | 420 | 204 |
| IX | 2601-3000 | 47 | 330 | 212 |
| X | 3001-3400 | 42 | 640 | 144 |
| XI | 3401-3700 | 55 | 1250 | 52 |
| XII | 3701-3940 | 548 | 1350 | 48 |
| XIII | 3941-4200 | 405 | 1150 | 46 |
| XIV | 4201-4500 | 175 | 1200 | 72 |
| XV | 4501-4800 | 85 | 720 | 64 |
| XVI | 4801-5200 | 35 | 500 | 132 |
| XVII | 5201-5550 | 53 | 190 | 136 |

Thus, many of the early fractions, and particularly Fraction VI, were kanamycin A base free of kanamycin B. Later fractions, and particularly Fractions XI, XII, XIII and XIV were pure kanamycin B base. The absence of kanamycin A from Fraction XII were confirmed by paper strip chromatography.

The two forms of kanamycin react as follows in the indicated qualitative tests:

| Test | A | B |
|---|---|---|
| Concentrated sulfuric acid | Colorless | Colorless. |
| Molisch | Slow formation of color. | Rapid formation of color. |
| Elson-Morgan | Weakly positive | Weakly positive. |
| Seliwanoff | Negative | |
| Folin and Ciocaltean | Weakly positive | Do. |
| Fishbach and Levin (HCl, $Me_2CO$) | Negative | Negative. |
| Fishbach and Levin (HCl, $H_2O$) | do | |
| Ninhydrin | Positive | |
| Reducing Sugar (ammoniacal silver nitrate) | Negative | |
| Sakaguchi | do | |
| Maltol | do | |
| Acid hydrolysis to "furfural" | Positive | Do. |

Comparison of the antibacterial properties of kanamycin A and kanamycin B gas the following results:

(A) IN VITRO SPECTRUM BY THE AGAR DILUTION METHOD

| Organism | Minimum Inhibitory, Kanamycin A | Concentration in mcg./ml., Kanamycin B |
|---|---|---|
| Aerobacter aerogenes | 2.8 | 1.6 |
| Alcaligenes faecalis | 3.1 | 3.1 |
| Bacillus anthracis | 1.1 | 1.2 |
| Bacillus cereus | 3.1 | 1.6 |
| Bacillus cereus var. mycoides PCI #213 | 3.1 | 0.8 |
| Bacillus circulans | 1.25 | 2.5 |
| Brucella bronchiseptica | 3.1 | 1.6 |
| Clostridium welchii | >200 | >200 |
| Corynebacterium xerosis | 1.4 | 0.4 |
| Diplococcus pneumoniae | 11.2 | 12.5 |
| Gaffkia tetragena | 1.25 | 0.31 |
| Lactobacillus acidophilus ATCC #4356 | 25.0 | 25.0 |
| Lactobacillus casei ATCC #4646 | 50.0 | 25.0 |
| Micrococcus flavus ATCC #10240 | 2.5 | 1.25 |
| Mycobacterium sp. #607 | 0.31 | 0.625 | adding an alkali metal salt of dodecylbenzenesulfonic acid in an amount in the range of 0.7 to 3.0 g. per 1,000,000 mcg. kanamycin by plate assay and separating the kanamycin B-dodecylbenzenesulfonate thus formed and precipitated.

10. In the process of recovering purified kanamycin B from an aqueous solution below pH 7.1 containing both kanamycin A and kanamycin B, the consecutive steps of adding an alkali metal salt of dodecylbenzenesulfonic acid in an amount in the range of 0.7 to 3.0 g. per 1,000,000 mcg. kanamycin by plate assay and separating the kanamycin B-dodecylbenzenesulfonate thus formed and precipitated and then decomposing said kanamycin B-dodecylbenzenesulfonate by metathetical reaction to regenerate purified kanamycin B.

References Cited in the file of this patent
UNITED STATES PATENTS 2,664,420   Lott et al. _____ Dec. 29, 1953